(Model.)
C. C. GERLACH.
GREASE CUP.
No. 358,739. Patented Mar. 1, 1887.
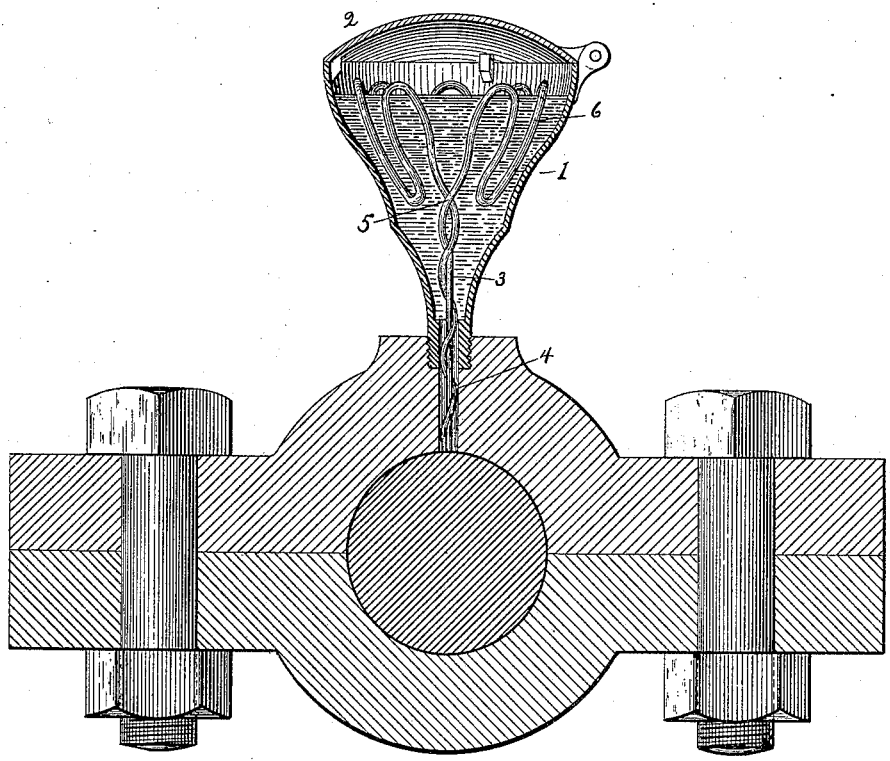
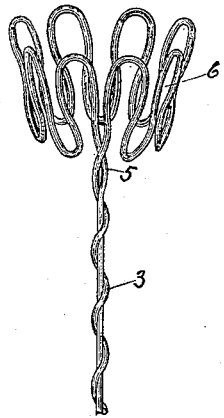
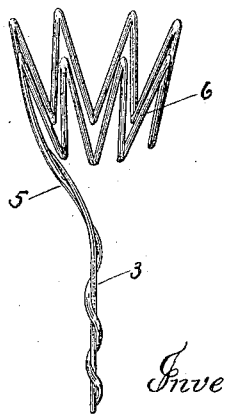
Attest:
Geo. T. Smallwood.
Edward Steer.
Inventor:
Carl C. Gerlach
By Knight Bros
Attys

United States Patent Office.

CARL C. GERLACH, OF CLEVELAND, OHIO, ASSIGNOR TO RUDOLPH P. GERLACH, OF SAME PLACE.

GREASE-CUP.

SPECIFICATION forming part of Letters Patent No. 358,739, dated March 1, 1887.

Application filed August 9, 1886. Serial No. 210,420. (Model.)

*To all whom it may concern:*

Be it known that I, CARL C. GERLACH, a citizen of the United States, residing at Cleveland, in the county of Cuyahoga and State of Ohio, have invented certain new and useful Improvements in Grease-Cups or Lubricators, of which the following is a specification.

My improved grease-cup is intended for feeding solid lubricants, and my improvements relate to that form of feeder which is placed within the cup and adapted, by reason of being slightly heated, but still more by reason of being jarred by the shaft, to loosen and insure a constant supply of grease in the cup to the journal without the necessity of its being packed down by hand or other means.

My improvements will first be fully described with reference to the accompanying drawings, and then specifically pointed out in the claims.

In the drawings, Figure I represents my improved feeder within a grease-cup applied to the boxing of a shaft or journal. Fig. II is a perspective view of the preferred form of feeder detached. Fig. III is a similar view of a feeder of slightly modified form.

The cup 1 and lid 2 may be of customary form, adapted to contain a solid lubricant. Placed within the cup so that its shank 3 will extend through the feeding-orifice 4 and rest upon the revolving shaft, is my improved feeder. The feeder is made of a single piece of wire having its ends twisted together, as shown, to form the shank, bent outwardly at 5, so as to follow the shape of the interior of the cup, and having its intermediate portion looped or zigzag in form and approximately conforming in shape to the interior of the cup, providing an overhanging crown, 6, supported from the shank at one side of the cup, so that the portion of the cup beneath the crown, between the latter and the feeding-orifice, is reserved for the lubricant, except the narrow passage in the latter at one side of the cup occupied by the wire shank. Beneath the crown 6 thus formed at the top of the feeder there exists a free passage for the grease, while the looped or zigzag form of the crown portion insures the complete agitation of the grease when the feeder is slightly jarred by the shaft rotating under it. It is apparent that the curved or looped forms imparted to the wire in the construction shown in Fig. II is the equivalent of the angular zigzag forms shown in Fig. III. The two produce substantially the same result.

The peculiar form of the crown of my improved feeder, while insuring the feeding of the grease by reason of the jarring of the feeder, does not impede the natural flowing of the grease due to gravity, the grease being allowed to freely escape down the sides of the loops or zigzags and between the same.

I am aware that in grease-cups the principle of my device (*i. e.*, lubricating a revolving shaft by reason of the heat or jarring of a metallic conductor produced by said shaft and on which the conductor rests) is old; but I am not aware that any conductor has been so formed as that its major parts lie vertical, or nearly so, the stem of which is formed of the twisted ends of one or more pieces of wire, and the crown being formed in the intermediate portion of such wire, whereby the heat is thoroughly, evenly, and quickly distributed throughout the wire and an unobstructed flow of the melted grease obtained.

Having thus described my invention, the following is what I claim as new therein, and desire to secure by Letters Patent:

1. A feeder for grease-cups, comprising a twisted shank, 3, outwardly-bent portion 5, and overhanging crown 6, supported at one side from the bent portion and out of contact with the cover of the cup, substantially as shown and described.

2. A feeder for grease-cups, formed of a single piece of wire having twisted ends forming a shank, 3, outwardly-bent portion 5, and an overhanging crown, 6, supported at one side from the bent portion, having zigzag body, substantially as shown and described.

CARL C. GERLACH.

Witnesses:
WILLIAM CLARK,
W. H. SCHWARTZ.